Patented Mar. 15, 1949

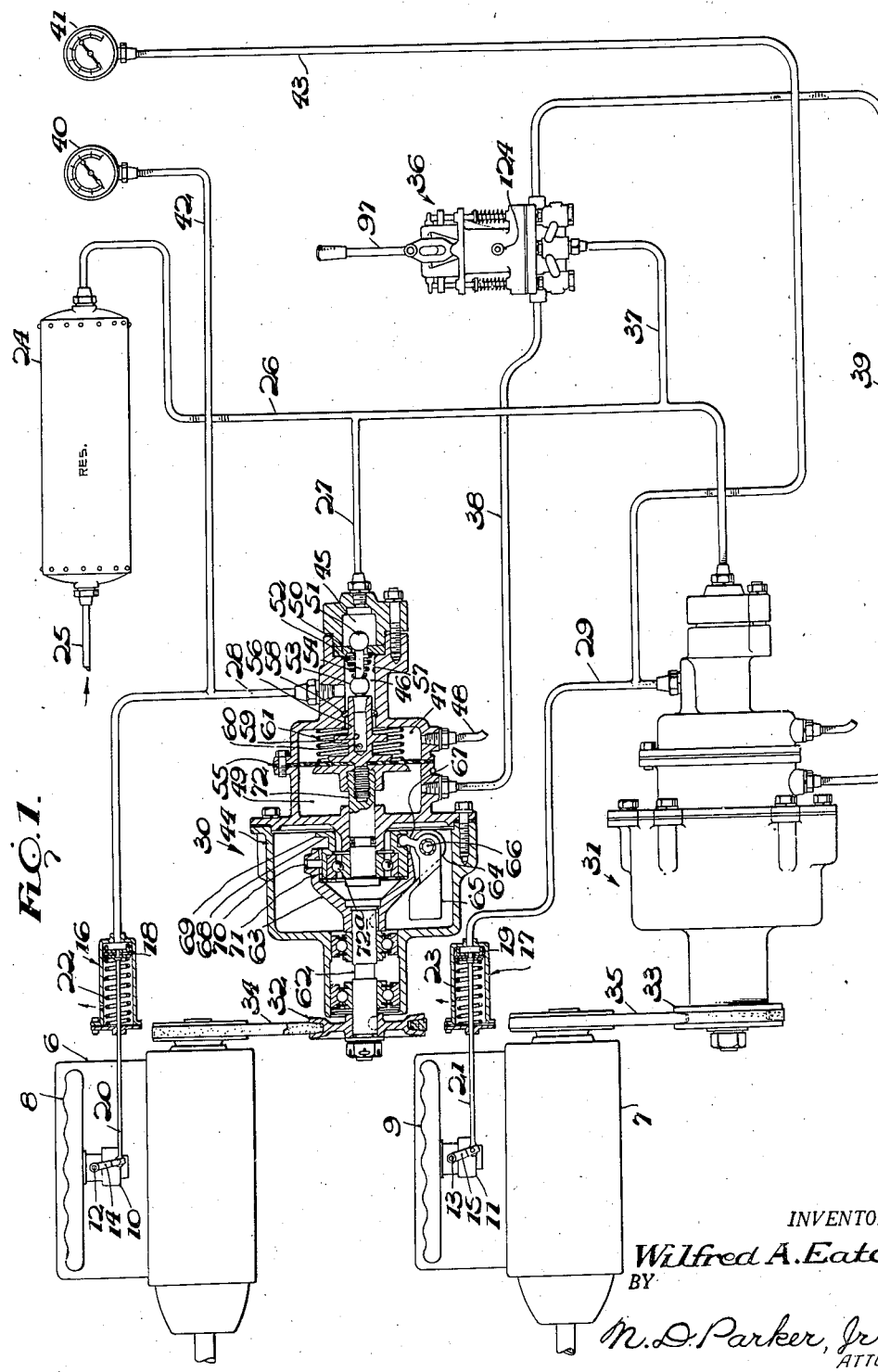

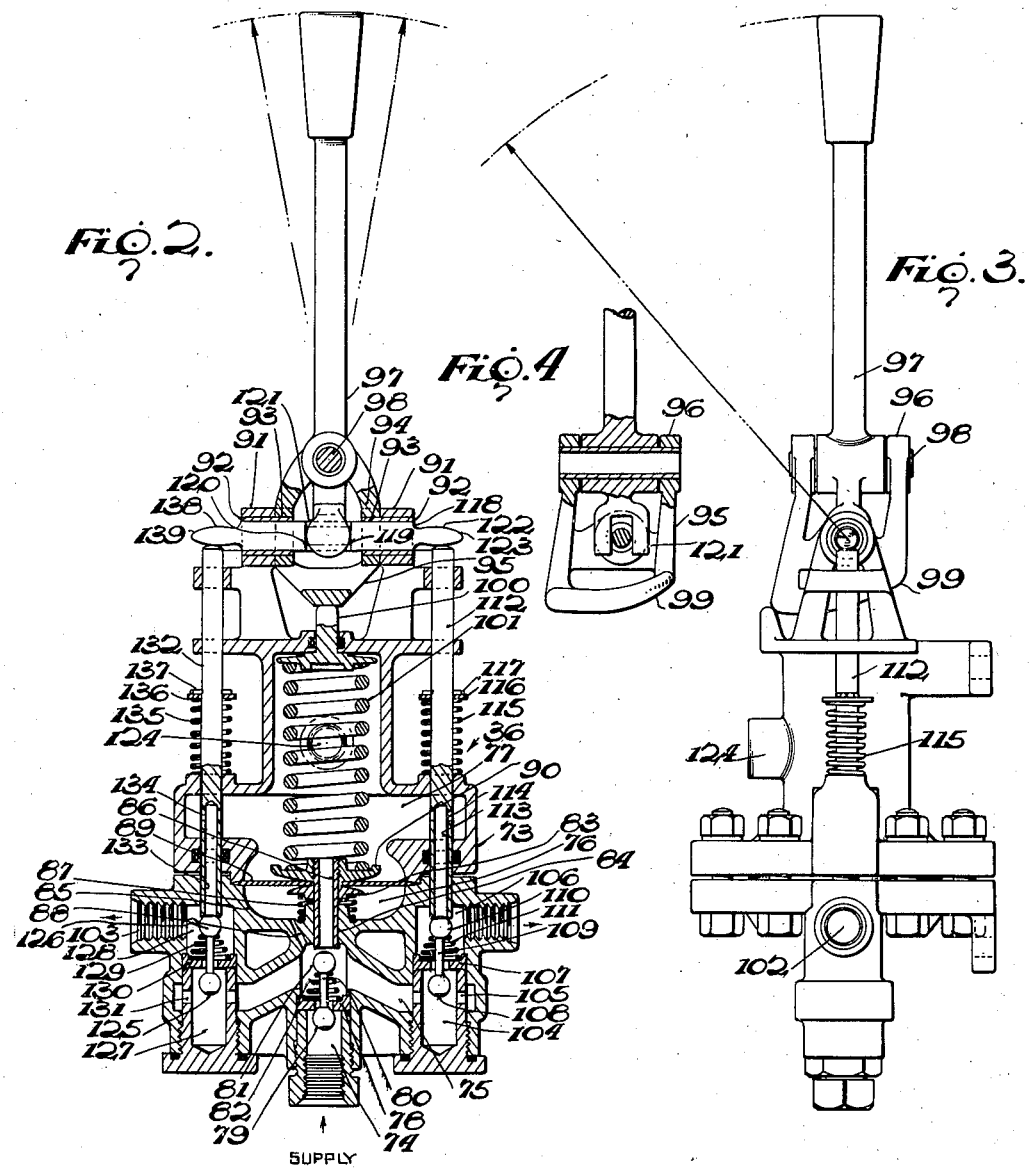

2,464,636

UNITED STATES PATENT OFFICE 2,464,636

FLUID PRESSURE CONTROL SYSTEM

Wilfred A. Eaton, Elyria, Ohio, assignor to Bendix-Westinghouse Automotive Air Brake Company, Elyria, Ohio, a corporation of Delaware Application July 28, 1943, Serial No. 496,512

3 Claims. (Cl. 60—97)

This invention relates to fluid pressure control mechanism, and more particularly to mechanism for controlling the speed of prime movers in airplanes.

It has previously been proposed to provide fluid pressure operated means for controlling the throttle valves of a plurality of engines in order to synchronize the speeds of the engines, but many of the above mechanisms have been unnecessarily complicated as well as poorly adapted to remote control operation, and it is accordingly one of the objects of the present invention to provide mechanism so constructed as to overcome these difficulties.

It hase also been common practice in the past, in connection with airplanes equipped with a plurality of engines for driving the airplane, to provide separate control levers for the throttle valves of the various engines, so arranged as to permit selective or concurrent operation of the various control levers in order to permit synchronization of the engine speeds as well as individual control of the speeds of the various engines in order to permit steering of the airplane when maneuvering on the ground, and it is an object of the present invention to provide a control system so constituted as to permit the pilot to control the speeds of the engines either selectively or concurrently by means of a single control element.

A further object of the invention is to provide means under the control of a single control element for automatically synchronizing the speeds of the engines, and for permitting the speeds of any separate group of engines to be individually controlled by the operation of the single control element.

Another object of the invention is to provide, in connection with a system of the above type, a novel control valve mechanism actuated by a single control element for either selectively or concurrently controlling the speeds of a plurality of engines.

Yet another object of the invention is to provide, in a system of the above type, means for automatically controlling the throttle valves of the engines to maintain the speeds of the engines in synchronism regardless of changes in the relative operating efficiencies of the engines.

A still further object of the invention is to provide, in a system of the above type, simple and efficient means for indicating to the pilot any change in the relative efficiencies of the various engines.

These and other objects and novel features of the invention will be more readily apparent when taken in connection with the accompanying drawings, wherein one form of the invention is illustrated. It is to be expressly understood, however, that the drawings are employed for the purpose of illustration only, and are not designed as a definition of the limits of the invention, reference being had for this purpose to the appended claims.

In the drawings:

Fig. 1 is a diagrammatic representation, partially in section, of a fluid pressure control system constructed in accordance with the principles of the present invention;

Fig. 2 is a view, partially in section, of one of the control valves;

Fig. 3 is a view showing a side elevation of the valve illustrated in Fig. 2, and Fig. 4 is a fragmentary view of the cam and lever utilized in the construction of the above valve.

Referring more particularly to Fig. 1 of the drawings, the invention is illustrated as applied to an airplane, not shown, provided with engines 6 and 7, these engines being provided respectively with intake manifolds 8 and 9 and carburetors 10 and 11, these carburetors being provided with the conventional throttle valves, not shown, adapted respectively to be operated through the medium of throttle valve shafts 12 and 13 and levers 14 and 15 operatively connected thereto. Fluid actuators 16 and 17 are provided for operating the above levers, these actuators being provided with pistons 18 and 19 connected with levers 14 and 15 through the medium of connecting rods 20 and 21, as shown, the pistons and connecting rods normally being maintained in the positions shown by means of the customary return springs 22 and 23. A fluid pressure reservoir 24 is provided, and supplied with fluid pressure from a suitable compressor, not shown, through a conduit 25, the reservoir being connected with the actuator 16 through a conduit 26, a conduit 27 and a conduit 28, and with the actuator 17 through conduit 26 and a conduit 29. Communication between conduits 27 and 28 is controlled by means of a centrifugal valve mechanism 30, communication between conduits 26 and 29 being controlled by an identical centrifugal valve mechanism 31. The centrifugal valve mechanisms 30 and 31 are provided with driving pulleys 32 and 33, respectively driven by the engines 6 and 7 through the medium of suitable belts 34 and 35 as shown, this action serving to control the operation of the valve mechanisms as will be more fully described hereinafter. In addition to the foregoing, means are also provided for controlling the operation of valves 30 and 31 by the application of fluid pressure from the reservoir 24, this application of fluid pressure being controlled by means of an operator's control valve mechanism 36, the valve mechanism being supplied with fluid pressure from the reservoir through conduit 26 and a conduit 37, and serving to supply fluid pressure to the valves 30 and 31 through conduits 38 and 39 respectively. Pressure gauges 40 and 41 are also provided adjacent the operator's position. The gauge 40 is connected with the actuator 16 through a conduit 42 and conduit 28, while the gauge 41 is connected with actuator 17 through a conduit 43 and conduit 29, the gauges thus serving to advise the operator of the pressure supplied to the actuators for reasons which will be more fully described hereinafter.

In view of the fact that the control valves 30 and 31 are identical in construction, it will be understood that a description of the valve 30, shown in section in the drawing, will also serve to describe the operation of the valve 31. The valve 30 is provided with a casing 44 provided with an inlet chamber 45, an outlet chamber 46, an exhaust chamber 47 provided with an atmospheric outlet 48, and a control chamber 49. A ported partition 50 serves to separate the chambers 45 and 46, communication between the chambers being normally prevented by means of an inlet valve 51 provided with a stem 52 having an exhaust valve 53 mounted in the left end thereof, the inlet valve being normally maintained in the position shown by means of a spring 54 interposed between the exhaust valve and the left face of the partition. The chambers 47 and 49 are separated by means of a flexible diaphragm 55, the diaphragm being connected at its center to a valve operating element 56 slidably mounted in a bore 57 formed in the chamber 46, a flexible sealing ring 58 serving to guide the valve operating element and at the same time to prevent the passage of fluid from chamber 46 to chamber 47 between the wall of the bore 57 and the outer wall of the valve operating element 56. A centrally located bore 59 is provided in the element in line with the exhaust valve 53, the right end of the bore being adapted to close on contact with the exhaust valve, and the left end of the bore being connected with the exhaust chamber 47 through the medium of a port 60 formed in the wall of the bore. The diaphragm and valve operating element are ordinarily biased to the left by means of a spring 61 interposed between the right face of the diaphragm and the casing. Thus it will be understood that with the parts in the position shown, the inlet valve serves to prevent communication between the conduits 27 and 28 and to permit communication between conduits 28 and 48, movement of the valve operating element to the right serving to first close the exhaust valve and prevent communication between conduits 28 and 48, and serving on further movement to the right to open the inlet valve and permit communication between conduits 27 and 28. As shown in the drawing, the chamber 49 is adapted to be supplied with fluid pressure from the reservoir 24 through the medium of conduits 26 and 37, control valve 36 and conduit 38, and it will therefore be understood that on operation of the control valve 36 to supply fluid pressure to the chamber 49, the diaphragm and the valve operating element will be moved to the right to close the exhaust valve and open the inlet valve to supply fluid pressure to the actuator 16 as above described. As the pressure builds up in the outlet chamber 46, this pressure will act on the area of the valve operating element 56 to oppose the force exerted by the diaphragm, it being noted that the valve mechanism can be so constructed as to provide any desired relation between the area of the diaphragm and the area of the valve operating element 56. The throttle actuator 16 is normally so positioned as to maintain the throttle valve of the carburetor 10 in idling position, and with the engine stationary or running at idling speed the valve parts already described occupy the positions shown.

In order that the valve operating element 56 may be controlled by the speed of the engine, the pulley 32 is connected with a shaft 62 rotatably mounted in the casing 44 and provided at its right end with a spider 63 provided with a plurality of lugs similar to lug 64 for the purpose of mounting suitable centrifugal weights. One of the weights 65 is illustrated as mounted pivotally on the lug 64 by means of a suitable pivot pin 66, the weight further being provided with a lever 67 having its upper end in engagement with a groove 68 formed in a collar 69 slidably mounted for endwise movement with respect to the spider, and mounted for rotation therewith by means of a pin 70 carried by the spider and having its lower end in engagement with a keyway 71 formed on the outer surface of the collar 69. The left side of the diaphragm is provided with a plunger 72 affixed thereto in line with the valve operating element 56 and slidably mounted in the casing, the left end of the plunger being in operative engagement with the collar 69 through the medium of a ball bearing 72a of conventional type having its inner race mounted for movement with the plunger as shown and the outer race mounted for movement with the collar. Thus, on application of fluid pressure to the chamber 49 to move the diaphragm to the right, with corresponding closing of the exhaust valve and opening of the inlet valve to connect conduits 27 and 28 and supply fluid pressure to the actuator 16 to open the throttle valve and increase the speed of the engine, it will be seen that the speed of the shaft 62 and the attached spider 63 will also increase correspondingly, with the result that the weight 65 and the other weights on the spider, which are connected in like manner with the collar 69, will be forced outward under the action of centrifugal force to cause counter-clockwise rotation of the weights and the application of a force tending to move the collar 69 to the left. This force will tend to oppose and balance the force exerted to the right by the action of fluid pressure on the diaphragm 55, and it will be understood that for any desired degree of pressure supplied to the chamber 49 and the diaphragm 55, the speed of the engine will be correspondingly increased until a point is reached such that the opposing force exerted by the centrifugal weights is such as to overcome the force exerted by fluid pressure on the diaphragm with resultant movement of the diaphragm and the valve operating element to the left to a point such that both the inlet and exhaust valves are maintained in closed position until such a time as the pressure in chamber 49 is changed or the speed of the engine changes to vary the opposing force and cause movement of the valve operating element in one direction or the other.

Thus the action of the centrifugal governor mechanism will tend to control the operation of the valves to maintain the pressure in the actuator 16 at a value such that the speed of the engine will always be directly proportional to the pressure supplied to the chamber 49, and in order that the pressure may be properly controlled by the operator, the control valve 36 is so constructed, as more particularly illustrated in Fig. 2, as to supply a pressure to the chamber 49 which is substantially proportional to the degree of movement of the operator's control element. The valve is provided with a casing 73 having an inlet chamber 74, an outlet chamber 75, a diaphragm chamber 76 and an exhaust chamber 77, the inlet chamber being separated from the outlet chamber by means of a ported partition 78, and the port in the partition being normally closed by means of an inlet valve 79 provided with a stem 80 having an exhaust valve 81 provided at its upper end. A spring 82, interposed between the exhaust valve and the partition, normally maintains the inlet valve in closed position as shown. A valve operating element 83 is slidably mounted in a bore 84 formed in a partition 85 which serves to separate the outlet chamber from the diaphragm chamber, the valve being provided with a centrally located bore 86 in communication at one end with the exhaust chamber and with the outlet chamber at the other end, downward movement of the element serving to contact the exhaust valve to close the lower end of the bore and to subsequently open the inlet valve to permit communication between the inlet chamber 74 and outlet chamber 75. The valve operating element is normally maintained in the position shown by means of a relatively light spring 87 interposed between the element and the partition 85, and the diaphragm chamber is connected with the outlet chamber by means of a restricted passage 88. The diaphragm chambers and exhaust chambers are separated by means of a flexible diaphragm 89 suitably carried by the housing as shown, the central portion of the diaphragm being clamped to the element 83 by means of a suitable nut 90. In order that the operation of the valves may be controlled by the operator, the upper portion of the housing is provided with a pair of brackets 91 serving to position a pair of bushings 92, these bushings extending inwardly from the brackets as shown and serving to engage the bore 93 of bosses 94 formed as a part of a valve operating cam 95, these bushings serving in connection with the bosses to position the cam for rotating movement relative to the casing as shown. The upper portion of the cam is provided with bosses 96 and an operating lever 97 is pivotally mounted thereon for movement in the plane of the drawing by means of a suitable pivot pin 98. The cam is shaped more particularly as shown in Fig. 4 of the drawing, being provided with a cam surface 99 adapted to engage a plunger 100 slidably mounted in the upper part of the casing and operatively connected with the nut 90 on the valve operating element 83 by means of a graduating spring 101, movement of the lever to rotate the cam thus serving to depress the plunger 100 and to transmit force to the valve operating element through the graduating spring and nut. Thus on movement of the lever in a counter-clockwise direction as viewed in Fig. 3, the valve operating element will be moved downward to first contact the exhaust valve and close the bore 86 and to subsequently open the inlet valve to admit fluid from the inlet chamber 74 to outlet chamber 75, and since the outlet chamber is connected with the diaphragm chamber by means of the restricted passage 88, it will be understood that the diaphragm will be subjected on its lower side to the pressure in the outlet chamber, thus causing an upward force on the valve operating element tending to oppose the force exerted by the graduating spring and to effect movement of both the valves to closed position when the upward force on the diaphragm slightly exceeds the force exerted by the graduating spring, this action being well-known in connection with control valves of the self-lapping type as will be readily apparent to those skilled in the art. The pressure maintained in the outlet chamber will therefore at all times be substantially proportional to the degree of movement of the plunger 100, and substantially proportional to the degree of movement of the control lever 97 in the event the cam is designed to have a lift which increases directly in accordance with the angle of movement thereof.

Fluid pressure is supplied to the above valve mechanism by means of conduits 26 and 37, the conduit 26 being connected with the reservoir and the conduit 37 being connected to the inlet chamber 47. The valve mechanism is provided with outlet ports 102 and 103, the former being connected with the centrifugal control valve 31 through the medium of conduit 39, and the latter being connected with the centrifugal control valve 30 through the medium of conduit 38. Separate control valve mechanisms are interposed between the outlet chamber and the outlet ports 102 and 103, the valve shown at the right of the drawing having an inlet chamber 104 having a connection with the outlet chamber 75 through ports 105 and an outlet chamber 106 connected with the outlet port 102. The chambers 104 and 106 are separated by means of a ported partition 107, communication between the chambers through the ported partition being controlled by means of an inlet valve 108 provided with an upwardly extending stem 109 having an exhaust valve 110 attached at the upper end, the valve assembly above described being normally urged in an upward direction by means of a spring 111 interposed between the partition and the exhaust valve. This valve assembly is adapted for operation by means of a valve operating member 112 slidably mounted in the casing as shown and being provided with a bore 113 at its lower end, this bore being open at the lower end and connected at its upper end with the exhaust chamber 77 by means of ports 114. The valve operating member 112 is normally urged in an upward direction by means of a spring 115 interposed between the casing and a suitable washer 116 slidably mounted on the member and held against upward movement by means of a pin 117. Operation of the plunger is controlled by means of a sliding cam member 118 slidably mounted in the bushings 92 and being adapted for endwise movement on corresponding rocking movement of the lever 97 about the pivot pin 98, by virtue of its connection therewith through shoulders 119 and 120 formed thereon and adapted to engage a forked end portion 121 formed on the lower end of the operating lever. The right end of the cam member 118 is provided with cam surfaces 122 and 123, the upper end of the plunger 112 normally resting against the surface 122 and being maintained in that position by means of the spring 115. Thus with the parts in the position shown, the inlet and exhaust valves 108 and 110 serve to permit communication between the outlet chamber 75 and the outlet port 102 through ports 105, inlet chamber 104, partition 107 and outlet chamber 106, and to prevent communication between the outlet port 102 and the exhaust chamber 77, while on movement of the lever 97 in a clockwise direction about the pivot pin 98, the cam member 118 will be moved to the left, allowing the plunger 112 to move upward as it engages the cam surface 123. When this action occurs, the plunger 112 will be moved upward under the action of spring 115 to permit closing of the inlet valve and opening of the exhaust valve 110 to prevent communication between the chamber 104 and the outlet port 102 and to establish communication between the outlet port and the exhaust chamber 77, the exhaust chamber being provided with an atmospheric port 124, while on movement of the lever 97 in a counter-clockwise direction from the position shown no change will occur in the position of the plunger 112 in view of the shape of the cam surface 122. In like manner, the left side of the valve mechanism is provided with a pair of similar intake and exhaust valves 125 and 126 for controlling the connection between an inlet chamber 127 and an outlet chamber 128, as well as between the outlet chamber 128 and the exhaust chamber 77, the valve being biased in an upward direction by means of a spring 129 interposed between the exhaust valve and a ported partition 130 which serves to separate the chambers 127 and 128, the chamber 127 in turn being connected with the outlet chamber 75 by means of suitable ports 131. The operation of these valves is controlled by a plunger 132 identical inconstruction with the plunger 112 and provided at its lower end with a bore 133, open at its lower end and connected at its upper end with the exhaust chamber 77 by means of ports 134. This plunger is biased in an upward direction by means of a spring 135 interposed between the casing and a washer 136 prevented against upward movement by means of a pin 137, the upper end of the plunger being in contact with a cam surface 138, identical in shape with the cam surface 122 and formed on the opposite end of the member 118. In like manner, a second surface 139 is formed on the left end of the member 118, this surface being of the same shape as that of the surface 123 but oppositely disposed. Thus on counter-clockwise rotation of the lever 97 about the pin 98, the cam member 118 will be moved to the right and the upper end of the plunger will engage the cam surface 139 to permit upward movement of the plunger and consequent closing of the inlet valve 125 and opening of the exhaust valve 126, it being apparent that during this action, the position of the plunger 112 will remain unchanged from that shown in the drawing.

From the foregoing description, it will be readily understood that the construction of the control valve 36 is such that on normal operation of the control lever in a plane vertical to the plane of the drawing as shown in Fig. 2, fluid pressure will be supplied to the outlet ports 102 and 103 in an amount proportional to the degree of movement of lever 97, and consequently to the left sides of the diaphragms in the centrifugal control valves 30 and 31 through conduits 38 and 39, the same pressure thus being applied to the diaphragms of both centrifugal control valves at all times during this type of operation of the mechanism. In many cases, however, it is necessary for the operator to control the speed of one of the engines while maintaining the other engine or engines at idling speed, and this can be accomplished in the present instance by rocking the lever about the pivot pin 98, rocking of the lever in a clockwise direction as viewed in Fig. 2 serving to prevent the supplying of fluid pressure to the centrifugal valve 31 to control the pressure in the actuator 17, and movement of the lever in the reverse direction serving to give the reverse control operation. On the other hand, movement of the lever 97 to rotate the cam 95 serves at all times to operate the valves 79 and 81 to supply fluid pressure to the outlet chamber 75, in an amount proportional to the degree of movement of the cam, and it will thus be seen that movement of the lever in the above manner will serve to supply fluid pressure to the outlet chamber 75 while movement of the lever about the pivot pin 98 will serve to selectively prevent this fluid pressure from being supplied to one or the other of the centrifugal control valves and to thus control only the speed of that engine which is controlled by the centrifugal valve to which the fluid pressure is supplied. Thus, by operating a single lever, the operator may maintain both of the engines at any desired synchronized speed, or may individually control the speed of either engine, or the speed of a group of engines in order to steer the airplane when maneuvering on the ground.

Assuming that both the engines are identical, it will be apparent that substantially the same degree of throttle opening for both engines will be necessary to maintain these engines at the same speed, but in the event the efficiency of the engine 6, for example, is lessened for some reason, an increased opening of the throttle will be necessary in order to maintain the speed at the same value as that of engine 7. Such a drop in efficiency will immediately be reflected in the speed of the centrifugal governor which controls the pressure in the actuator 16, and this decrease in speed will permit the fluid pressure acting on the diaphragm 55 to open the intake valve of the control valve 30 to correspondingly increase the pressure supplied to the actuator 16, a new condition of balance being reached eventually wherein the pressure in the actuator 16 is greater than the pressure in the actuator 17, with a correspondingly greater throttle opening for the engine 6, thus synchronizing the speeds of the engines with different degrees of throttle opening for the two engines. It is desirable that the operator be advised of any such decrease in efficiency of one of the engines, and this is accomplished in the present instance by means of the pressure gauges 40 and 41 which serve to indicate to the operator the pressures in the actuators 16 and 17, it being obvious that in the event the pressure gauge 40 shows a higher reading than the pressure gauge 41, the efficiency of engine 6 is less than that of the engine 7. Thus a reliable indication of the relative efficiencies of the engines is available to the operator at all times. While the above system has been shown as applied to a pair of engines, it will be clearly understood that a group of engines may be controlled in substantially the same manner, if desired.

Although the invention has been illustrated and described with considerable particularity, it is to be understood that the same is not limited to the form shown but may receive a variety of mechanical expressions as will readily appear to those skilled in the art. Reference will, therefore, be had to the appended claims for a definition of the limits of the invention.

What is claimed is:

1. The combination with a plurality of engines each having a control element for controlling the speed of the engine, of fluid pressure operated means for controlling the operation of the said elements and synchronizing the speeds of the engines including a fluid pressure actuator for each element, individual means responsive to the speed of each engine for controlling the fluid pressure energization of each corresponding actuator, each of said means including a self-lapping valve device having a pressure responsive member associated therewith, and including also a plurality of governor weights driven by the respective engine and arranged to move the pressure responsive member in accordance with changes in engine speed, and means for subjecting all of said pressure responsive members to the same degree of fluid pressure to control said speed responsive means comprising a self-lapping valve device having a supply valve, a plurality of release valves and a diaphragm constructed and arranged to maintain said same degree of pressure irrespective of variations in the position of said pressure responsive member caused by operation of said governor weights.

2. The combination with a plurality of engines each having a throttle control element for controlling the speed of the engine, of air pressure control means for controlling the operation of said elements and synchronizing the speeds of the engines including a pressure operated actuator for each element, individual means responsive to the speed of each engine for controlling the supply of air pressure to each corresponding actuator, each of said means including a self-lapping valve device having a diaphragm associated therewith, and including also a plurality of governor weights driven by the respective engine and arranged to move the diaphragm in accordance with changes in engine speed, and means for subjecting said diaphragms to the same degree of air pressure to control said speed responsive means comprising a self-lapping valve device constructed and arranged to maintain said same degree of pressure irrespective of variations in the position of said diaphragm caused by operation of said governor weights.

3. The combination with a pair of engines, each having a control element for controlling the speed thereof, of fluid pressure control means for controlling the operation of said elements including a fluid actuator for each element, separate self-lapping valve means for controlling the supply of fluid pressure to each actuator, means for controlling the operation of each of said valve means including a centrifugal governor responsive to the speed of the corresponding engine and a fluid motor, a control member mounted for movement in two different intersecting planes, a self-lapping control valve having a connection with each of said motors and operable on movement of said control member in one plane to supply fluid pressure to said motor at a pressure proportional to the degree of movement of said member, and means operable on movement of said control member in either direction in the other plane for closing the connection to either of said motors so that the pressure applied to the other motor is substantially proportional to the degree of movement of said member in said one plane, said control valve including a diaphragm and a supply valve constructed and arranged to maintain constant the pressure supplied thereby regardless of the action of said governor.

WILFRED A. EATON.

REFERENCES CITED

The following references are of record in the file of this patent:

UNITED STATES PATENTS

| Number | Name | Date |
|---|---|---|
| 1,538,167 | Chappell | May 19, 1925 |
| 2,081,946 | Martin | June 1, 1937 |
| 2,082,410 | McCauley | June 1, 1937 |
| 2,103,274 | Sanford | Dec. 28, 1937 |
| 2,138,148 | Eckert | Nov. 29, 1938 |
| 2,148,305 | Sanford | Feb. 21, 1939 |
| 2,251,293 | Schwartz | Aug. 5, 1941 |
| 2,265,260 | Argo | Dec. 9, 1941 |
| 2,322,518 | Huber | June 22, 1943 |